US012597959B2

(12) United States Patent
Luo et al.

(10) Patent No.: US 12,597,959 B2
(45) Date of Patent: Apr. 7, 2026

(54) COLLABORATIVE BASEBAND PROCESSING IN MIMO SYSTEMS USING NEURAL NETWORKS

(71) Applicant: Micron Technology, Inc., Boise, ID (US)

(72) Inventors: Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 18/583,689

(22) Filed: Feb. 21, 2024

(65) Prior Publication Data

US 2025/0047320 A1 Feb. 6, 2025

Related U.S. Application Data

(60) Provisional application No. 63/487,380, filed on Feb. 28, 2023.

(51) Int. Cl.
*H04B 1/401* (2015.01)
*H04B 7/06* (2006.01)

(52) U.S. Cl.
CPC ........... *H04B 1/401* (2013.01); *H04B 7/0691* (2013.01)

(58) Field of Classification Search
CPC . H04B 1/401; H04B 7/02; H04B 7/04; H04B 7/0404; H04B 7/0608; H04B 7/0691; H04W 92/08; H04W 92/10; H04W 92/18
(Continued)

(56) References Cited

U.S. PATENT DOCUMENTS 9,485,063 B2 11/2016 Shattil
2017/0353845 A1* 12/2017 Jeong ..................... G06Q 50/01
(Continued)

FOREIGN PATENT DOCUMENTS

WO WO-2010102423 A1 * 9/2010 ............. H04B 7/024
WO 2011155255 A1 12/2011
WO 2024182209 A1 9/2024

OTHER PUBLICATIONS

International Search Report & Written Opinion dated Jun. 3, 2024 for PCT Application No. PCT/US2024/016924.
(Continued)

*Primary Examiner* — Young T. Tse
(74) *Attorney, Agent, or Firm* — Dorsey & Whitney LLP

(57) ABSTRACT

A system includes a first wireless communication device comprising a first baseband processor neural network configured to process at least part of data for transmission to a second wireless communication device according to a collaborative processing configuration while collaborative processing is enabled to generate a first radio frequency (RF) signal. The first wireless communication device is configured to transmit the first RF signal. The system further includes a third wireless communication device comprising a second baseband processor neural network configured to, while the collaborative processing is enabled, process at least part of the data for transmission to the second wireless communication device according to a collaborative processing configuration to generate a second RF signal. The third wireless communication device is configured to transmit the second RF signal in collaboration with transmission of the first RF signal by the first baseband processor.

20 Claims, 6 Drawing Sheets

(58) Field of Classification Search
    USPC ..... 375/259, 260, 267; 370/310.2, 328, 334;
            455/101, 426.1, 426.2, 456.5, 456.6, 500
    See application file for complete search history.

(56) References Cited

U.S. PATENT DOCUMENTS

| | | | |
|---|---|---|---|
| 2018/0234854 A1* | 8/2018 | Zhang | H04L 5/0091 |
| 2020/0343985 A1 | 10/2020 | O'Shea et al. | |
| 2021/0126669 A1 | 4/2021 | Roberts et al. | |
| 2021/0160149 A1 | 5/2021 | Ma et al. | |
| 2022/0029665 A1 | 1/2022 | Hong et al. | |
| 2023/0246756 A1* | 8/2023 | Khoshnevisan | H04B 7/26 |
| | | | 370/329 |

OTHER PUBLICATIONS

PCT Application No. PCT/US24/16924, titled "Collaborative Baseband Processing in MIMO Systems Using Neural Networks" filed Feb. 22, 2024, pp. all pages of application as filed.

Morsali, Alireza , et al., "Deep Learning-Based Hyrid Analog-Digital Signal Processing in Mmwave Massive-MIMO Systems", IEEE Access, Jul. 2022, 15 pages.

Srivastav, Prateek Saurabh, et al., "Precise Channel Estimation Approach for a Mmwave MIMO System", Applied Sciences, Jun. 2020, 19 pages.

* cited by examiner

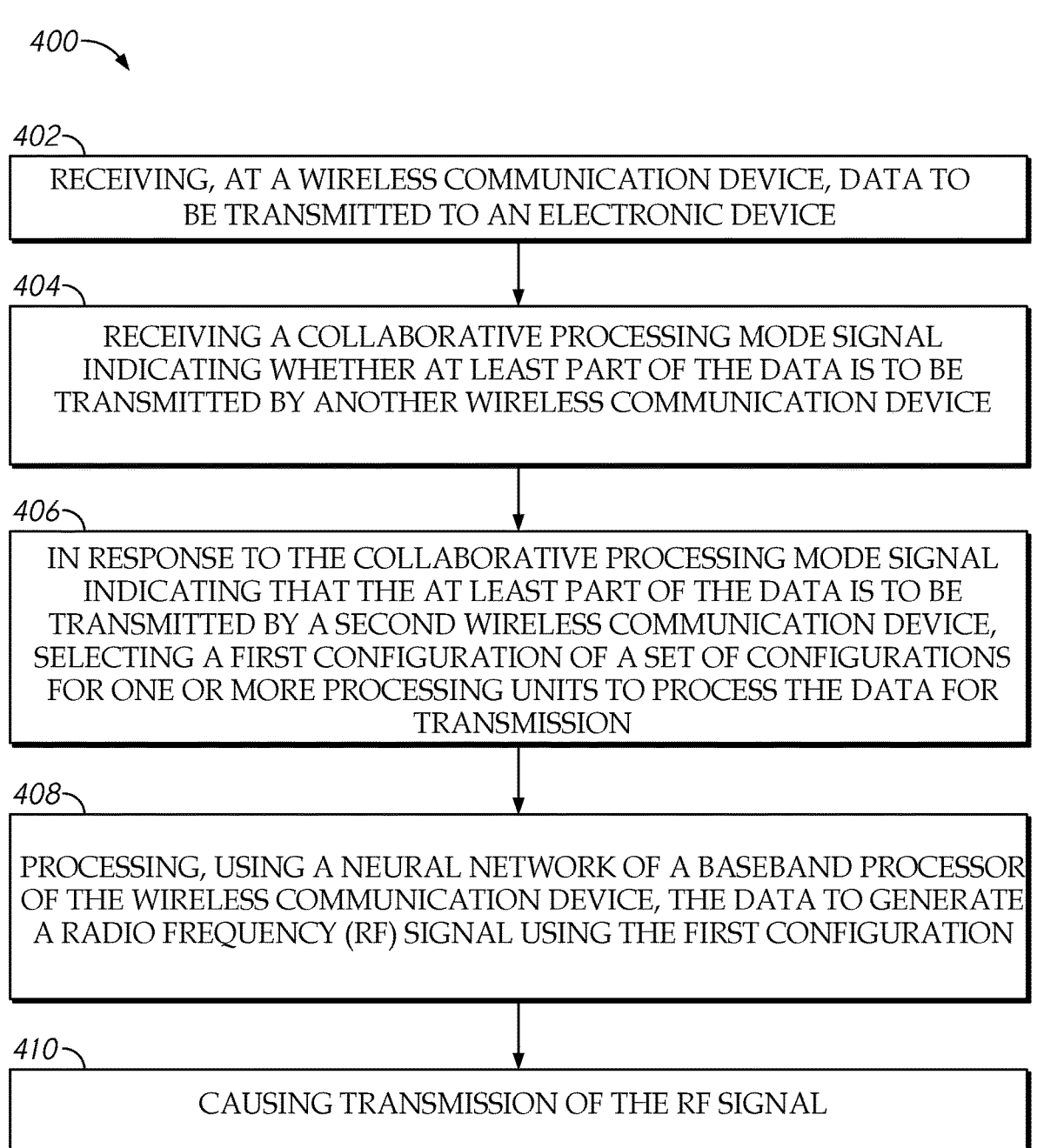

400

402

RECEIVING, AT A WIRELESS COMMUNICATION DEVICE, DATA TO BE TRANSMITTED TO AN ELECTRONIC DEVICE

404

RECEIVING A COLLABORATIVE PROCESSING MODE SIGNAL INDICATING WHETHER AT LEAST PART OF THE DATA IS TO BE TRANSMITTED BY ANOTHER WIRELESS COMMUNICATION DEVICE

406

IN RESPONSE TO THE COLLABORATIVE PROCESSING MODE SIGNAL INDICATING THAT THE AT LEAST PART OF THE DATA IS TO BE TRANSMITTED BY A SECOND WIRELESS COMMUNICATION DEVICE, SELECTING A FIRST CONFIGURATION OF A SET OF CONFIGURATIONS FOR ONE OR MORE PROCESSING UNITS TO PROCESS THE DATA FOR TRANSMISSION

408

PROCESSING, USING A NEURAL NETWORK OF A BASEBAND PROCESSOR OF THE WIRELESS COMMUNICATION DEVICE, THE DATA TO GENERATE A RADIO FREQUENCY (RF) SIGNAL USING THE FIRST CONFIGURATION

410

CAUSING TRANSMISSION OF THE RF SIGNAL

FIG. 4

COLLABORATIVE BASEBAND PROCESSING IN MIMO SYSTEMS USING NEURAL NETWORKS

CROSS REFERENCE TO RELATED APPLICATION(S)

This application claims the benefit under 35 U.S.C. § 119 of the earlier filing date of U.S. Provisional Application Ser. No. 63/487,380 filed Feb. 28, 2023, the entire contents of which are hereby incorporated by reference in their entirety for any purpose.

BACKGROUND

In typical wireless communication networks, mobile devices communicate with a single base station at a time. That is, as a mobile device physically relative to a group of base stations, communication with the mobile device is handed off from one base station to another base station better positioned to serve the mobile device. This can limit communication efficiency and throughput at the mobile device, especially in MIMO systems where some of the antennae may not be oriented in an optional direction at the base station.

BRIEF DESCRIPTION OF DRAWINGS

FIG. 4 is a flowchart of a method arranged in accordance with examples described herein.

DETAILED DESCRIPTION

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, and software operations have not been shown in detail in order to avoid unnecessarily obscuring the described embodiments of the present disclosure.

Examples described herein include multiple input, multiple output (MIMO) systems that use collaborative baseband processing and digital RF processing to communicate with a single mobile device using multiple base stations programmed with a neural network. That is, the communication throughput is extended by setting up the system where multiple base stations can communicate with a mobile device simultaneously (e.g., contemporaneously). The multiple base stations may implement a neural network that is trained to efficiently simultaneously communicate with the mobile device. For example, rather than communicating using 100 antennae on a single base station (some of which may not be positioned or oriented to provide the best throughput), the mobile device may communicate with two base stations using a respective subset of the 100 antennae on each individual base station. A large neural network may be trained to effectively distribute the communications between the two base stations. While each base station may implement a respective, individual neural network, the respective, individual neural networks may collectively form a system level neural network that allows them to work in concert with each other.

Each individual base station may be configured to switch between a standalone baseband processing mode and the collaborative baseband processing mode. For example, the neural network on each base station may include a neural network that may be trained such that a first set of weights are configured to enable the standalone mode and a second set of weights are configured to enable the collaborative baseband processing mode. Enabling collaborative communications in this way may reduce complexity and enhance configurability of the system to operate more efficiently based on positional, environmental, and network congestion conditions.

Figure 1A:
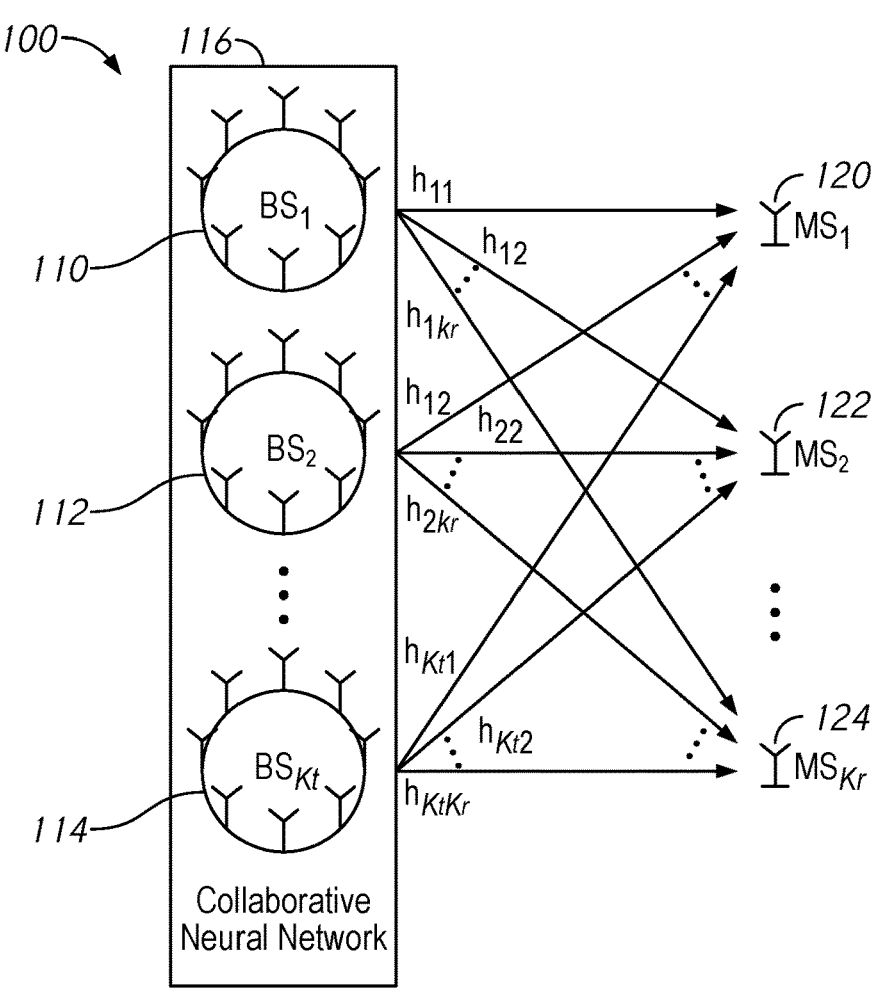
FIG. 1A is a schematic illustration of a wireless communication system 100 arranged in accordance with embodiments of the disclosure.

FIG. 1A is a schematic illustration of a wireless communication system 100 arranged in accordance with embodiments of the disclosure. The system 100 includes base stations 110, 112, 114 and electronic devices 120, 122, 124. The base stations 110, 112, 114 may be in communication with the electronic devices 120, 122, 124. In some examples, two or more of the base stations 110, 112, 114 may be contemporaneously or simultaneously with one of the electronic devices 120, 122, 124 when engaged in a collaborative communication mode. That is, the base stations 110, 112, 114 may implement collaborative communication to provide some or all of a message to one of the electronic devices 120, 122, 124. In some examples, each of the base stations 110, 112, 114 may implement a respective neural network that combine to form a collaborative neural network 116 to implement the collaborative communication between the base stations 110, 112, 114 and the electronic devices 120, 122, 124. In some examples, the respective neural networks hosted on each of the base stations 110, 112, 114 may be configurable such that one set of weights may program the neural network to implement standalone communication and another set of weights may program the neural network to perform the collaborative communication. The electronic devices 120, 122, 124 may be referred to as user equipment (UE), mobile terminals, or the like. The electronic devices 120, 122, 124 may be a particular category or class of UE, as may be defined by a wireless communication standard (e.g., LTE, 5G New Radio, etc.).

A category or class of UE may indicate or include various characteristics or capabilities, including number of antennas, duplexing capability, spatial multiplexing capability, or the like. The electronic devices 120, 122, 124, or both, may provide an indication of their category or capability to base stations 110, 112, 114, or to a network via base stations 110, 112, 114. In some examples, electronic devices 120, 122, 124 may provide an indication of their respective category or capability to one another. The electronic devices 120, 122, 124 may implement the techniques described herein or may be requested by one another or by base stations 110, 112, 114 to implement techniques described herein according to their respective categories or capabilities. Devices having a same or similar category or capability may be referred to as peer devices.

In operation, the base stations 110, 112, 114 may communicate with the electronic devices 120, 122, 124 using a wireless communication protocol. Communication originating at base stations 110, 112, 114 and terminating at an electronic device 120, 122, 124 may be referred to as a downlink or forward link communication. Such communication may also be referred to as occurring on the downlink. Communication originating at an electronic device 120, 122, 124 and terminating at base stations 110, 112, 114 may be referred to as an uplink or reverse link communication. Such communication may also be referred to as occurring on the uplink. The communication may be in accordance with any of a variety of protocols, including, but not limited to long term evolution (LTE), LTE advanced (LTE-A), 5G New Radio (NR), 5G-Advanced or other standards developed by the 3rd Generation Partnership Project (3GPP), for example. The communication may further include a variety of modulation/demodulation schemes may be used, including, but not limited to: orthogonal frequency division multiplexing (OFDM), filter hank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing.

The communication between the electronic devices 120, 122, 124 and the base stations 110, 112, 114 may support full duplex communication. The communication may be based on techniques that time-division multiplex data into different slots, frequency-division multiplex data, or combinations thereof. Examples of time-division multiplex techniques used for relaying data may include generalized selection combining (GSC), distributed space-time coding (DSTC), and opportunistic relaying selection (ORS). Handshake protocols may be implemented to confirm received of data at the electronic devices 120, 122, 124 from the base stations 110, 112, 114, or at the base stations 110, 112, 114 from the electronic devices 120, 122, 124, such as acknowledgement (ACK) messages.

During a full-duplex communication, the base stations 110, 112, 114 may each contemporaneously provide part or all of a message to one of the electronic devices 120, 122, 124 and/or may each receive a message from the one of the electronic devices 120, 122, 124 (e.g., a response message, such as an ACK message) via a common carrier frequency. In some responses, the transmitted message may be in response to a previously received message. In an example of a full-duplex transmission mode, a wireless transmitter and antenna pair of one of the electronic devices 120, 122, 124 may communicate with a wireless receiver and antenna pair of the more than one of the base stations 110, 112, 114 contemporaneously with a wireless receiver and antenna pair of two or more of the base stations 110, 112, 114 communicating with a wireless transmitter and antenna pair of the electronic devices 120, 122, 124. The communications may occur during predefined time periods (e.g., symbol periods, slots, subframes, etc.) according to an implemented protocol, such as one of the GSC, DSTC, or ORS protocols.

In some examples, the base stations 110, 112, 114 may each communicate contemporaneously with one of the electronic devices 120, 122, 124 collaboratively such that each is transmitting the same message or parts of the same message to the one of the electronic devices 120, 122, 124 at the same time. Similarly, the one of the electronic devices 120, 122, 124 may communicate contemporaneously with two or more of the base stations 110, 112, 114 collaboratively such that the one of the electronic devices 120, 122, 124 is transmitting the same message or parts of the same message to the two or more of the base stations 110, 112, 114 at the same time. This collaborative communication may improve the reliability and mitigate messages being lost as the electronic devices 120, 122, 124 physically move relative to the base stations 110, 112, 114. In some examples, each of the base stations 110, 112, 114 may implement a respective neural network that combine to form the collaborative neural network 116 to implement the collaborative communication between the electronic devices 120, 122, 124 and the base stations 110, 112, 114. In some examples, the respective neural networks hosted on each of the base stations 110, 112, 114 may be configurable such that one set of weights may program the neural network to implement singular communication between a base station 110, 112, 114 and one of the electronic devices 120, 122, 124 communication and another set of weights may program the neural network to perform the collaborative communication.

To enable full-duplex communication, self-interference received by a receiving antenna from a transmitting antenna on the same device (e.g., one of the base stations 110, 112, 114 or the electronic devices 120, 122, 124) may be compensated for to filter out signals from the transmitted antenna. Self-interference may generally refer to any wireless interference generated by transmissions from antennas of an electronic device to signals received by other antennas, or same antennas, on that same electronic device.

The base stations 110, 112, 114 and the electronic devices 120, 122, 124 may be implemented using generally any electronic device for which communication capability is desired. For example, the base stations 110, 112, 114 may be implemented using a Wi-Fi access point, an LTE/LTE-A evolved node B (eNB) LTE/LTE-A), or a 5G next generation node B (gNB), or other standardized base station. Each of the electronic devices 120, 122, 124 may be implemented using a mobile phone, smartwatch, computer (e.g. server, laptop, tablet, desktop), or radio. In some examples, the electronic devices 120, 122, 124 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1A, the base stations 110, 112, 114 the electronic devices 120, 122, 124 0 may include any of a variety of components in some examples, including, but not limited to, memory, input/output devices, circuitry, processing units (e.g. processing elements and/or processors), or combinations thereof.

Each of the base stations 110, 112, 114 and the electronic devices 120, 122, 124 may support multiple input, multiple output (MIMO) systems, MIMO systems generally refer to systems including one or more electronic devices that transmit signals using multiple antennas and one or more electronic devices that receive signals using multiple antennas. In some examples, electronic devices may both transmit and receive signals using multiple antennas. Some example systems described herein may be "massive MIMO" systems. Generally, massive MIMO systems refer to systems employing greater than a certain number (e.g. 64) antennas to transmit and/or receive transmissions. As the number of antennas increase, so too generally does the complexity involved in accurately transmitting and/or receiving transmissions. Thus, the base stations 110, 112, 114 and the electronic devices 120, 122, 124 may each include multiple antennas, including 2, 3, 4, 5, 6, 7, 8, 9, 10, 11, 12, 13, 14, 15, 16, 32, or 64 antennas to support a MIMO system. Other numbers of antennas may be used in other examples. In some examples, the electronic devices 120, 122, 124 may have a same number of antennas, and a different number of antennas than the base stations 110, 112, 114. In other examples, the base stations 110, 112, 114 and the electronic devices 120, 122, 124 may each have different numbers of antennas.

Although three of base stations 110, 112, 114, three electronic devices 120, 122, 124 are shown in FIG. 1A, the system may include any number of base stations and electronic devices.

The base stations 110, 112, 114 and the electronic devices 120, 122, 124 may each include receivers, transmitters, and/or transceivers. Generally, receivers may be provided for receiving transmissions from one or more connected antennas, transmitters may be provided for transmitting transmissions from one or more connected antennas, and transceivers may be provided for receiving and transmitting transmissions from one or more connected antennas. Generally, multiple receivers, transmitters, and/or transceivers may be provided in an electronic device—one in communication with each of the antennas of the electronic device. The transmissions may be in accordance with any of a variety of protocols, including, but not limited to 5G NR signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (LTMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards. In some examples, techniques described herein may be employed by a relay node, which may have the same or similar functionality as a base station or access point. Or a relay node may provide more limited functionality than a base station but may be a fixed terminal or node that receives and forwards (e.g., repeats) a signal received from one device (e.g., a UE) to another device (e.g., a base station).

Examples of transmitters, receivers, and/or transceivers may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 1B:
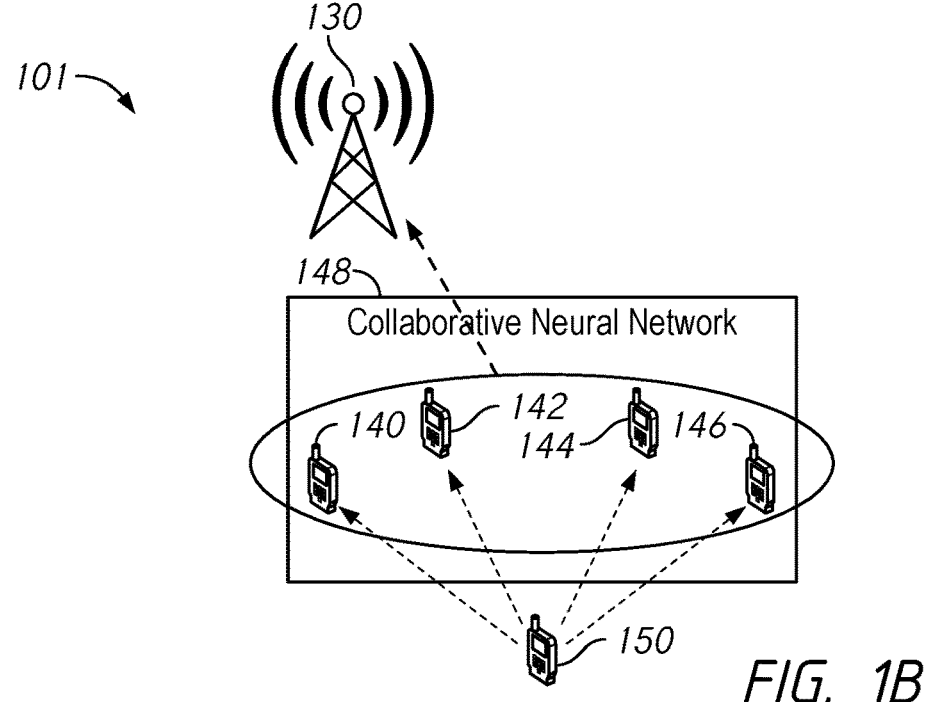
FIG. 1B is a schematic illustration of another wireless communication system 100 arranged in accordance with embodiments of the disclosure.

FIG. 1B is a schematic illustration of another wireless communication system 100 arranged in accordance with embodiments of the disclosure. The system 100 includes a base station 130, electronic devices 140, 142, 144, 146, and an electronic device 150. The base station 130 may be in communication with the electronic device 150 via the electronic devices 140, 142, 144, 146. That is, the electronic devices 140, 142, 144, 146 may implement device-to-device collaborative communication to relay information between the base station 130 and the electronic device 150. In some examples, each of the electronic devices 140, 142, 144, 146 may implement a respective neural network that combine to form a collaborative neural network 148 to implement the device-to-device collaborative communication between the base station 130 and the electronic device 150. In some examples, the respective neural networks hosted on each of the electronic devices 140, 142, 144, 146 may be configurable such that one set of weights may program the neural network to implement standalone communication and another set of weights may program the neural network to perform the collaborative communication. The electronic devices 140, 142, 144, 146 and/or the electronic device 150 may be referred to as user equipment (UE), mobile terminals, or the like. The electronic devices 140, 142, 144, 146 or the electronic device 150, or both, may be a particular category or class of UE, as may be defined by a wireless communication standard (e.g., LTE, 5G New Radio, etc.).

A category or class of UE may indicate or include various characteristics or capabilities, including number of antennas, duplexing capability, spatial multiplexing capability, or the like. The electronic devices 140, 142, 144, 146 or the electronic device 150, or both, may provide an indication of their category or capability to base station 130, or to a network via bases station 130. In some examples, electronic devices 140, 142, 144, 146 or the electronic device 150 may provide an indication of their respective category or capability to one another. The electronic devices 140, 142, 144, 146 or the electronic device 150 may implement the techniques described herein or may be requested by one another or by base station 130 to implement techniques described herein according to their respective categories or capabilities. Devices having a same or similar category or capability may be referred to as peer devices and may thus facilitate peer-to-peer communications, which may be in contrast to communication between base station 130 and electronic devices 140, 142, 144, 146 or electronic device 150.

In operation, the base station 130 may communicate with the electronic devices 140, 142, 144, 146 using a wireless communication protocol. Communication originating at base station 130 and terminating at an electronic device 140, 142, 144, 146 or electronic device 150 may be referred to as a downlink or forward link communication. Such communication may also be referred to as occurring on the downlink. Communication originating at an electronic device 140, 142, 144, 146 or electronic device 150 and terminating at base station 130 may be referred to as an uplink or reverse link communication. Such communication may also be referred to as occurring on the uplink. Communication between electronic devices 140, 142, 144, 146 or between an electronic device 140, 142, 144, 146 and an electronic device 150 (e.g., D2D communication) may be referred to as a sidelink. Such communication may also be referred to as occurring on the sidelink. The communication may be in accordance with any of a variety of protocols, including, but not limited to long term evolution (LTE), LTE advanced (LTE-A), 5G New Radio (NR), 5G-Advanced, or other standards developed by the 3rd Generation Partnership Project (3GPP), for example. The communication may further include a variety of modulation/demodulation schemes may be used, including, but not limited to: orthogonal frequency division multiplexing (OFDM), filter hank multi-carrier (FBMC), the generalized frequency division multi-plexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing.

The communication between the electronic devices 140, 142, 144, 146 and the electronic device 150 may support full duplex communication to relay data from the base station 130 to the electronic device 150 and from the electronic device 150 to the base station 130. For example, one of the electronic devices 140, 142, 144, 146 may relay information from the base station 130 to the electronic device 150. The relaying communication may be based on techniques that time-division multiplex data into different slots. Examples of time-division multiplex techniques used for relaying data may include generalized selection combining (GSC), distributed space-time coding (DSTC), and opportunistic relaying selection (ORS). Handshake protocols may be implemented to confirm received of data at the electronic device 150 from the base station 130, or at the base station 130 from the electronic device 150, such as acknowledgement (ACK) messages.

During a full-duplex communication, the electronic device 150 may contemporaneously receive a message from one of the electronic devices 140, 142, 144, 146 and transmit another message (e.g., an ACK message) to the same or another of the electronic devices 140, 142, 144, 146 via a common carrier frequency. In some responses, the transmitted message may be in response to a previously received message. In an example of a full-duplex transmission mode, a wireless transmitter and antenna pair of one of the electronic devices 140, 142, 144, 146 may communicate with a wireless receiver and antenna pair of the electronic device 150 contemporaneously with a wireless receiver and antenna pair of one (e.g., the same or different one) of the electronic devices 140, 142, 144, 146 communicating with a wireless transmitter and antenna pair of the electronic device 150. The communications may occur during predefined time periods (e.g., symbol periods, slots, subframes, etc.) according to an implemented protocol, such as one of the GSC, DSTC, or ORS protocols.

In some examples, the electronic devices 140, 142, 144, 146 may communicate contemporaneously with the electronic device 150 collaboratively such that each is transmitting the same message or parts of the same message to the electronic device 150 at the same time. Similarly, the electronic device 150 may communicate contemporaneously with two or more of the electronic devices 140, 142, 144, 146 collaboratively such that each is transmitting the same message or parts of the same message to the two or more of the electronic devices 140, 142, 144, 146 at the same time. This collaborative communication may improve the reliability and mitigate messages being lost as the electronic devices 140, 142, 144, 146 and the electronic device 150 physically move relative to one another. In some examples, each of the electronic devices 140, 142, 144, 146 may implement a respective neural network that combine to form the collaborative neural network 148 to implement the device-to-device collaborative communication between electronic devices 140, 142, 144, 146 and the electronic device 150. In some examples, the respective neural networks hosted on each of the electronic devices 140, 142, 144, 146 may be configurable such that one set of weights may program the neural network to implement standalone communication and another set of weights may program the neural network to perform the collaborative communication.

To enable full-duplex communication, self-interference received by a receiving antenna from a transmitting antenna on the same device (e.g., one of the electronic devices 140, 142, 144, 146 or the electronic device 150) may be compensated for to filter out signals from the transmitted antenna. Self-interference may generally refer to any wireless interference generated by transmissions from antennas of an electronic device to signals received by other antennas, or same antennas, on that same electronic device.

The base station 130, the electronic devices 140, 142, 144, 146, and the electronic device 150 may be implemented using generally any electronic device for which communication capability is desired. For example, the base station 130 may be implemented using a Wi-Fi access point, an LTE/LTE-A evolved node B (eNB) LTE/LTE-A), or a 5G next generation node B (gNB), or other standardized base station. Each of the electronic devices 140, 142, 144, 146 and the electronic device 150 may be implemented using a mobile phone, smartwatch, computer (e.g. server, laptop, tablet, desktop), or radio. In some examples, the electronic devices 140, 142, 144, 146 and/or the electronic device 150 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1B, the base station 130, the electronic devices 140, 142, 144, 146 and/or the electronic device 150 may include any of a variety of components in some examples, including, but not limited to, memory, input/output devices, circuitry, processing units (e.g. processing elements and/or processors), or combinations thereof.

Each of the base station 130, the electronic devices 140, 142, 144, 146, and the electronic device 150 may support multiple input, multiple output (MIMO) systems, MIMO systems generally refer to systems including one or more electronic devices that transmit signals using multiple antennas and one or more electronic devices that receive signals using multiple antennas. In some examples, electronic devices may both transmit and receive signals using multiple antennas. Some example systems described herein may be "massive MIMO" systems. Generally, massive MIMO systems refer to systems employing greater than a certain number (e.g. 64) antennas to transmit and/or receive transmissions. As the number of antennas increase, so too generally does the complexity involved in accurately transmitting and/or receiving transmissions. Thus, the base station 130, the electronic devices 140, 142, 144, 146, and the electronic device 150 may each include multiple antennas, including 2, 3, 4, 5, 6, 7, 8, 9, 10, 11, 12, 13, 14, 15, 16, 32, or 64 antennas to support a MIMO system. Other numbers of antennas may be used in other examples. In some examples, the electronic devices 140, 142, 144, 146 and the electronic device 150 may have a same number of antennas, and a different number of antennas than the base station 130. In other examples, the base station 130, the electronic devices 140, 142, 144, 146, and the electronic device 150 may each have different numbers of antennas.

Although one base station 130, four electronic devices 140, 142, 144, 146, and one electronic device 150 are shown in FIG. 1B, the system may include any number of base stations and electronic devices.

The base station 130, the electronic devices 140, 142, 144, 146, and the electronic device 150 may each include receivers, transmitters, and/or transceivers. Generally, receivers may be provided for receiving transmissions from one or more connected antennas, transmitters may be provided for transmitting transmissions from one or more connected antennas, and transceivers may be provided for receiving and transmitting transmissions from one or more connected antennas. Generally, multiple receivers, transmitters, and/or transceivers may be provided in an electronic device-one in communication with each of the antennas of the electronic device. The transmissions may be in accordance with any of a variety of protocols, including, but not limited to 5G NR signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (LTMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards. In some examples, techniques described herein may be employed by a relay node, which may have the same or similar functionality as a base station or access point. Or a relay node may provide more limited functionality than a base station but may be a fixed terminal or node that receives and forwards (e.g., repeats) a signal received from one device (e.g., a UE) to another device (e.g., a base station).

Examples of transmitters, receivers, and/or transceivers may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2:
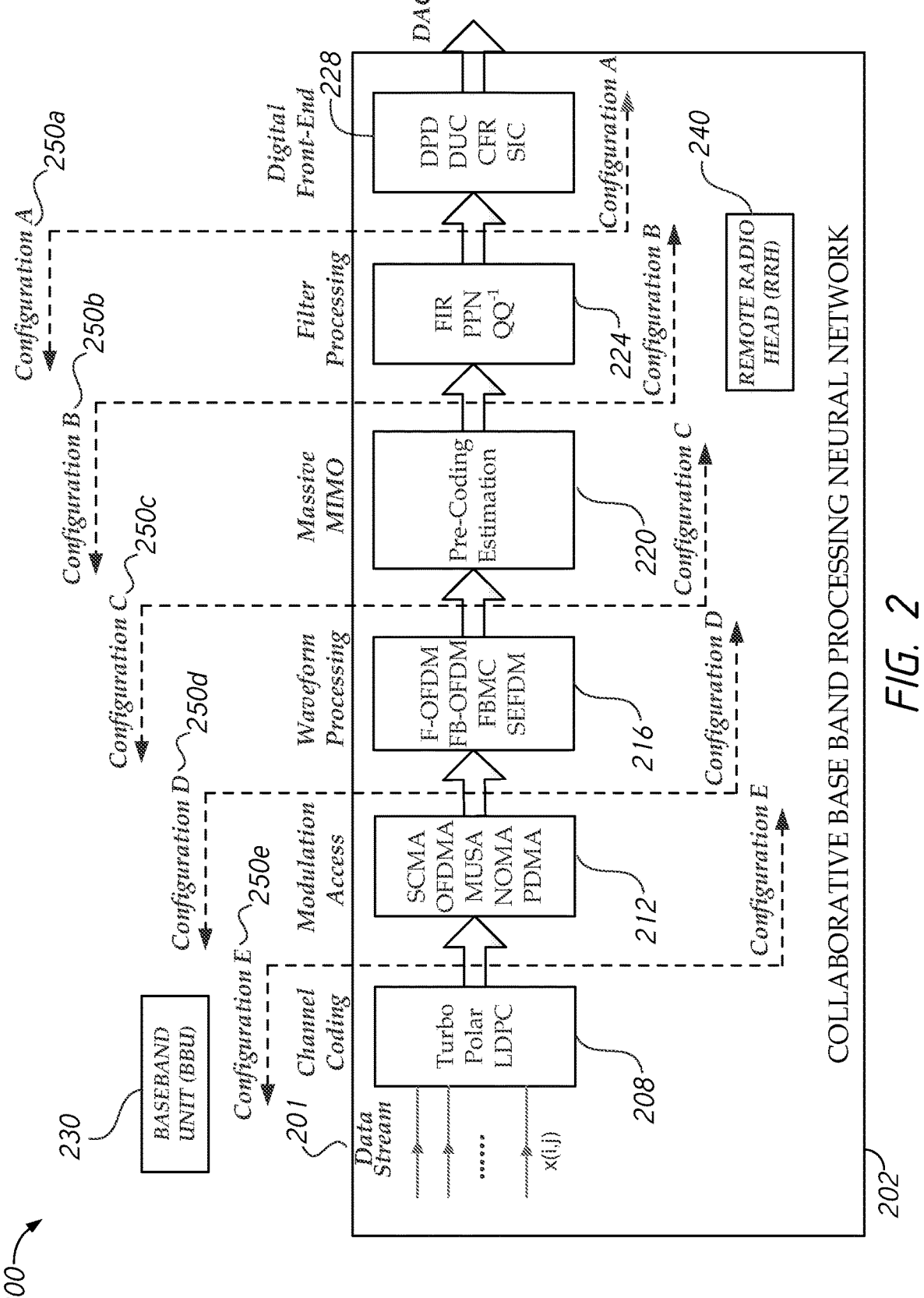
FIG. 2 is a schematic illustration of a computing system arranged in accordance with examples described herein.

FIG. 2 is a schematic illustration of a computing system 200 arranged in accordance with examples described herein. The computing system 200 includes a baseband unit (BBU) 230 and a remote radio head (RRH) 240. While not depicted as coupled in FIG. 2, the BBU 230 and the RRH 240 may be coupled via a fronthaul link. The computing system 200 may be configured to implement various configuration modes 250a-250e, with each configuration mode allocating a wireless processing stage to either the BBU 230 or the RRH 240, as indicated by the directional dotted arrows pointing towards either the BBU 230 or the RRH 240. The computing system 200 receives input data x (i,j) 201 from the source data and performs wireless processing stages on the input data. The BBU 230 and the RRH 240 operate in conjunction upon the input data x (i,j) 201 to perform various wireless processing stages, with the operation of the wireless processing stage dependent on the configuration mode 250a-e.

The wireless processing stages of FIG. 2 include channel coding 208, modulation access 212, waveform processing 216, massive MIMO 220, filter processing 224, and digital front-end 228. Channel coding 208 may include Turbo coding, polar coding, or low-density parity-check (LDPC) coding. It can be appreciated that channel coding 208 can include various types of channel coding. Modulation access 212 may include sparse code multiple access (SCMA), orthogonal frequency division multiple access (OFDMA), multi-user shared access (MUSA), non-orthogonal multiple access (NOMA), and/or polarization division multiple access (PDMA). Waveform processing 216 may include Filtered-Orthogonal Frequency Division Multiplexing (F-OFDM), Filter-Bank Frequency Division Multiplexing (FB-OFDM), Spectrally Efficient Frequency Division Multiplexing (SEFDM), and/or Filter Bank Multicarrier (FBMC). It can be appreciated that modulation access 212 can include various types of modulation access. The Massive MIMO 220 may include pre-coding estimation and various other functionalities associated with Massive MIMO. Filter processing 224 may include various types of digital filters, such as a finite impulse response (FIR) filter, a poly-phase network (PPN) filter, and/or $QQ^{-1}$ filter, which may refer to a filter that adjusts for compression and decompression of data. The digital front-end 228 may include baseband processing of a wireless transmitter or a wireless receiver. Such a digital front-end may include various functionalities for operating as a digital front-end transmitter or receiver, such as: an analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), and/or self-interference cancellation (SIC).

It can be appreciated that the RRH 240 may operate as a wireless transmitter or a wireless receiver (or both as multiplexing wireless transceivers). While depicted in FIG. 2 with the RRH 240 operating as a wireless transmitter (by receiving a processed input data stream x (i,j) 201), it can be appreciated that the RRH 240 may operate as a wireless receiver that receives a transmitted wireless signal and processes that signal, according to wireless processing stages allocated to the RRH 240. The data flow may flow the opposite way to the depiction of FIG. 2, with the functionalities of the various wireless processing stages inverted. For example, in a configuration mode E 250e, the BBU 230 may receive an intermediate processing result from the RRH 240 and decode that intermediate processing result at the wireless processing stage associated with channel coding 208.

Upon determination of a configuration mode or upon receiving a configuration mode selection, the computing system 200 may allocate the wireless processing stages 208, 212, 216, 220, 224, and 228 to either the BBU 230 or the RRH 240. The configuration mode A 250a configures the RRH 240 to perform the one wireless processing stage, the digital front-end 228. In configuration mode A 250a, the other wireless processing stages, channel coding 208, modulation access 212, waveform processing 216, massive MIMO 220, and filter processing 224, are performed by the BBU 230. The computing system 200 may receive an additional configuration mode selection or determine a different configuration mode, based at least on processing times of the BBU 230 and the RRH 240. When a different configuration mode is specified, the BBU 230 and the RRH 240 may allocate processing unit(s) of each accordingly to accommodate the different configuration mode. Each configuration mode 250a-250e may be associated with a different set of weights for both the BBU 230 and the RRH 240 that is to be mixed with either the input data x (i,j) 201 or an intermediate processing result. Coefficients may be also associated with specific wireless protocols, such as 5G wireless protocols, such that the BBU 230 and the RRH 240 may be processed according to different wireless protocols. The intermediate processing results may be any processing result received by the other entity (e.g., the RRH 240 or the BBU 230), upon completion of processing by the initial entity (e.g., the BBU 230 or the RRH 240, respectively). As depicted in FIG. 2, various configuration modes 250a-250e are possible.

In some examples, the computing system 200 may contemporaneously, semi-contemporaneously, or non-contemporaneously, process data the channel coding 208, modulation access 212, waveform processing 216, massive MIMO 220, filter processing 224, digital front-end 228, or a combination thereof, using the collaborative processing neural network 202. The computing system 200 may process data using each stage contemporaneously, or using some stages contemporaneously while using other stages at different times, for processing. In this way, the baseband processing stages (e.g., channel coding 208, modulation access 212, waveform processing 216, massive MIMO 220, filter processing 224, digital front-end 228) may be implemented using a single neural network. In some examples, the collaborative processing neural network 202 may be adjusted to support collaborative baseband processing in which the computing system 200 and at least one other, similar computing system collaboratively communicate (e.g., contemporaneously or simultaneously communicate) some or part of a message to a target device. In some examples, the collaborative processing neural network 202 may be programmed to implement the collaborative communication by setting weights for the neural network. By implementing the collaborative baseband processing via the collaborative processing neural network 202, the complexity of the computing system 200 may be reduced and flexibility may be increased as compared with a different baseband processor for each baseband processing mode.

Figure 3:
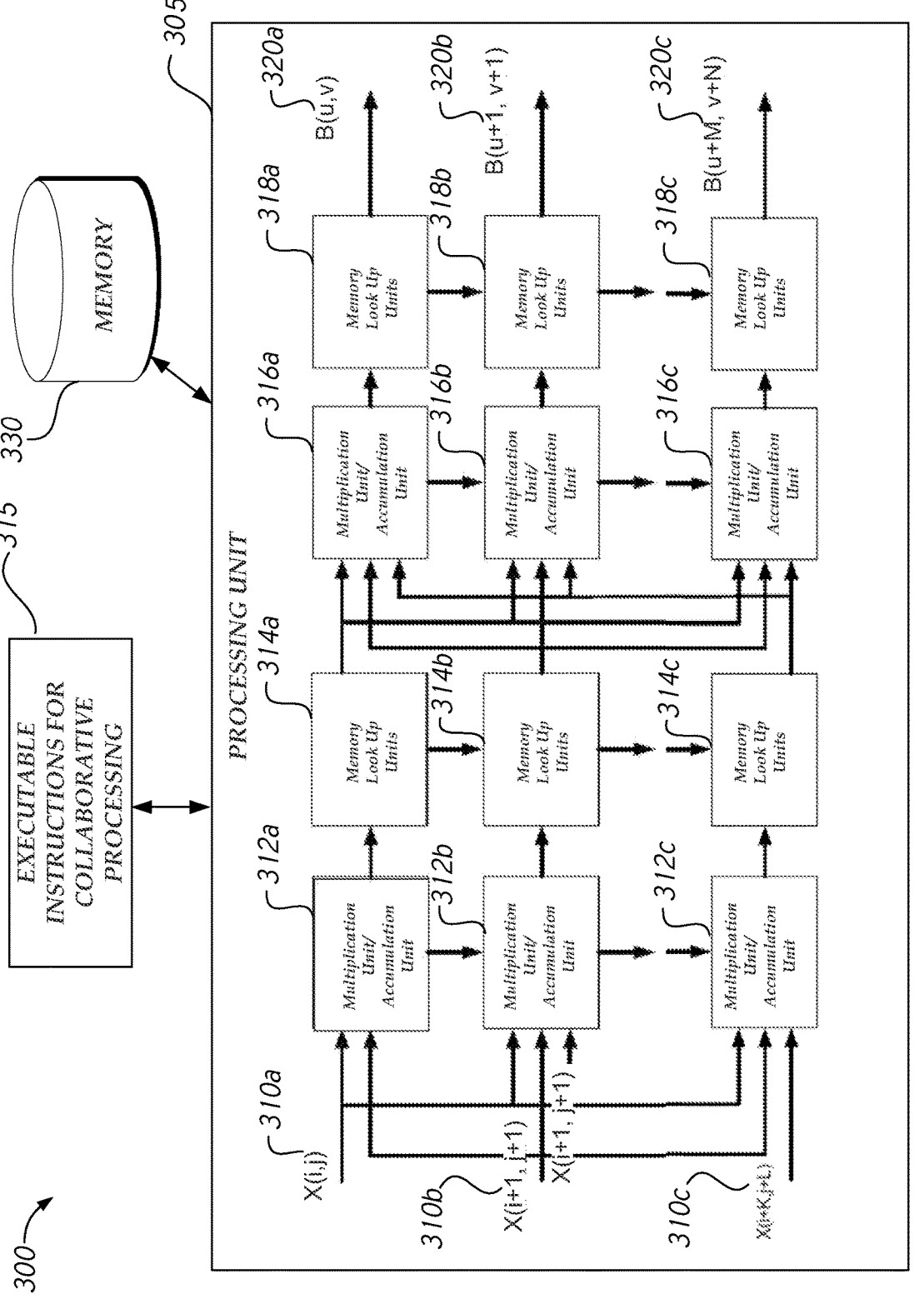
FIG. 3 is a diagram of an electronic device arranged in accordance with examples described herein.

FIG. 3 is a block diagram of a processing unit 305 arranged in a computing system 300 in accordance with examples described herein. The system 300 may be implemented in any of the base stations 110, 112, 114 of FIG. 1A or the base station 130 of FIG. 1B or the electronic devices 120, 122, 124 of FIG. 1A or the electronic devices 140, 142, 144, 146, 150 of FIG. 1B, for example. The processing unit 305 may receive input data (e.g. X (i,j)) 310a-c from such a computing system. In some examples, the input data 310a-c may be input data, such as data received from a sensor or data stored in the memory 330. For example, data stored in the memory 330 may be output data generated by one or more processing units implementing another processing stage. The processing unit 305 may include multiplication unit/accumulation units 312a-c, 316a-c and memory lookup units 314a-c, 318a-c that, when mixed with weight data retrieved from the memory 330, may generate output data (e.g. B (u,v)) 320a-c. In some examples, the output data 320a-c may be utilized as input data for another processing stage or as output data to be transmitted via an antenna.

In implementing one or more processing units 305, a computer-readable medium at a base station or an electronic device may execute respective control instructions and control instructions to perform operations through executable instructions 315 within a processing unit 305. For example, the control instructions provide instructions to the processing unit 305, that when executed by the computing system 300, cause the processing unit 305 to configure the multiplication units 312a-c to multiply input data 310a-c with weight data and accumulation units 316a-c to accumulate processing results to generate the output data 320a-c.

The multiplication unit/accumulation units 312a-c, 316a-c multiply two operands from the input data 310a-c to generate a multiplication processing result that is accumulated by the accumulation unit portion of the multiplication unit/accumulation units 312a-c, 316a-c. The multiplication unit/accumulation units 312a-c, 316a-c adds the multiplication processing result to update the processing result stored in the accumulation unit portion, thereby accumulating the multiplication processing result. For example, the multiplication unit/accumulation units 312a-c, 316a-c may perform a multiply-accumulate operation such that two operands, M and N, are multiplied and then added with P to generate a new version of P that is stored in its respective multiplication unit/accumulation units. The memory look-up units 314a-c, 318a-c retrieve weight data stored in memory 330. For example, the memory look-up unit can be a table look-up that retrieves a specific weight. The output of the memory look-up units 314a-c, 318a-c is provided to the multiplication unit/accumulation units 312a-c, 316a c that may be utilized as a multiplication operand in the multiplication unit portion of the multiplication unit/accumulation units 312a-c, 316a-c. Using such a circuitry arrangement, the output data (e.g. B (u,v)) 320a-c may be generated from the input data (e.g. X (i,j))310a-c).

In some examples, weight data, for example from memory 330, can be mixed with the input data X (i,j) 310a-c to generate the output data B (u,v) 320a-c. The relationship of the weight data to the output data B (u,v) 320a-c based on the input data X (i,j) 310a-c may be expressed as:

$$B(u, v) = f\left( \sum_{m,n}^{M,N} a''_{m,n} f\left( \sum_{k,l}^{K,L} a'_{k,l} X(i+k, j+l) \right) \right) \quad (1)$$

where $$a'_{k,l}, a''_{m,n}$$

are weights for the first set of multiplication/accumulation units 312a-c and second set of multiplication/accumulation units 316a-c, respectively, and where $f(\cdot)$ stands for the mapping relationship performed by the memory look-up units 314a-c, 318a-c. As described above, the memory look-up units 314a-c, 318a-c retrieve weights to mix with the input data. Accordingly, the output data may be provided by manipulating the input data with multiplication/accumulation units using a set of weights stored in the memory associated with a desired wireless protocol. The resulting mapped data may be manipulated by additional multiplication/accumulation units using additional sets of weights stored in the memory associated with the desired wireless protocol. The sets of weights multiplied at each stage of the processing unit 305 may represent or provide an estimation of the processing of the input data in specifically-designed hardware (e.g., an FPGA).

Further, it can be shown that the system 300, as represented by Equation (1), may approximate any nonlinear mapping with arbitrarily small error in some examples and the mapping of system 300 is determined by the weights $$a'_{k,l}, a''_{m,n}.$$

For example, if such weight data is specified, any mapping and processing between the input data X (i,j) 310a-c and the output data B (u,v) 320a-c may be accomplished by the system 300. Such a relationship, as derived from the circuitry arrangement depicted in system 300, may be used to train an entity of the computing system 300 to generate weight data. For example, using Equation (1), an entity of the computing system 300 may compare input data to the output data to generate the weight data.

In the example of system 300, the processing unit 305 mixes the weight data with the input data X (i,j) 310a-c utilizing the memory look-up units 314a-c, 318a-c. In some examples, the memory look-up units 314a-c, 318a-c can be referred to as table look-up units. The weight data may be associated with a mapping relationship for the input data X (i,j) 310a-c to the output data B (u,v) 320a-c. For example, the weight data may represent non-linear mappings of the input data X (i,j) 310a-c to the output data B (u,v) 320a-c. In some examples, the non-linear mappings of the weight data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 314a-c, 318a-c may be deactivated. For example, one or more of the memory look-up units 314a-c, 318a-c may operate as a gain unit with the unity gain. In such a case, the instructions or instructions may be executed through executable instructions for collaborative processing 315 to facilitate selection of a unity gain processing mode for some or all of the memory look-up units 314a-c, 318a-c.

Each of the multiplication unit/accumulation units 312a-c, 316a-c may include multiple multipliers, multiple accumulation unit, or and/or multiple adders. Any one of the multiplication unit/accumulation units 312a-c, 316a may be implemented using an ALU. In some examples, any one of the multiplication unit/accumulation units 312a-c, 316a-c can include one multiplier and one adder that each perform, respectively, multiple multiplications and multiple additions. The input-output relationship of a multiplication/ accumulation unit 312, 316 may be represented as:

$$B_{out} = \sum_{i=1}^{I} C_i * B_{in}(i) \qquad (2)$$

where "I" represents a number to perform the multiplications in that unit, $C_i$ the weights which may be accessed from a memory, such as memory 330, and $B_{in}(i)$ represents a factor from either the input data X (i,j) 310a-c or an output from multiplication unit/accumulation units 312a-c, 316a-c. In an example, the output of a set of multiplication unit/ accumulation units, $B_{out}$, equals the sum of weight data, $C_i$ multiplied by the output of another set of multiplication unit/accumulation units, $B_{in}(i)$. $B_{in}(i)$ may also be the input data such that the output of a set of multiplication unit/ accumulation units, $B_{out}$, equals the sum of weight data, $C_i$ multiplied by input data.

FIG. 4 is a flowchart of a method 400 in accordance with examples described herein. Example method 400 may be implemented using, for example, any of the base stations 110, 112, 114 or the electronic devices 120, 122, 124 of FIG. 1A, any of the base station 130 or the electronic devices 140, 142, 144, 146, 150 of FIG. 1B, the computing system 200 in FIG. 2, and/or the computing system 300 in FIG. 3, or any system or combination of the systems depicted in FIGS. 1-3 described herein. In some examples, the steps in example method 400 may be performed by a computing system such as a computing system 300 of FIG. 3 implementing processing units in the hardware platforms (e.g., a reconfigurable fabric or neural network) therein as a processing unit 305 of FIG. 3. The method 400 described in steps 402-410 may also be stored as control instructions in a computer-readable medium at any of the base stations 110, 112, 114 or the electronic devices 120, 122, 124 of FIG. 1A, any of the base station 130 or the electronic devices 140, 142, 144, 146, 150 of FIG. 1B, the computing system 200 in FIG. 2, and/or the computing system 300 in FIG. 3, such as control, executable instructions 315, or memory 330 of FIG. 3. In some examples, various hardware platforms may implement the method 400, such as an ASIC, a DSP implemented as part of a FPGA, or a system-on-chip. In some examples, the method 400 may be implemented in a non-transitory computer readable medium including instructions executable to cause a wireless communication device to perform one or more of the operations of the method 400.

The method 400 may include receiving, at a wireless communication device, data to be transmitted to an electronic device, at 402.

The method 400 may include receiving a collaborative processing mode signal indicating whether at least part of the data is to be transmitted by another wireless communication device, at 404. In some examples, the first configuration corresponds to a source data processor stage, wherein the second configuration corresponds to a baseband processor stage.

The method 400 may include in response to the collaborative processing mode signal indicating that the at least part of the data is to be transmitted by a second wireless communication device, selecting a first configuration of a set of configurations for one or more processing units to process the data for transmission, at 406.

The method 400 may include processing, using a neural network of a baseband processor of the wireless communication device, the data to generate a radio frequency (RF) signal using the first configuration, at 408. In some examples, the method 400 may further include in response to the collaborative processing mode signal indicating that the data is to be transmitted by solely by the wireless communication device, selecting a second configuration of the set of configurations for one or more processing units to process the data for transmission, and processing, using the neural network of the baseband processor of the wireless communication device, the data to generate the RF signal using the second configuration. In some examples, the method 400 may further include selecting a first set of weights to provide the neural network as the first configuration; and selecting a second set of weights to provide the neural network as the second configuration The method 400 may include causing transmission of the RF signal, at 410. In some examples, the method 400 may further include causing transmission of the RF signal contemporaneous with a second RF signal transmitted from the second wireless communication device while in the first configuration, wherein the second RF signal is based on the data. In some examples, the method 400 may further include causing transmission of the RF signal via a first subset of antennae while in the first configuration, and causing transmission of the RF signal via a second subset of antennae while in the second configuration. In some examples, the second subset of antennae includes more antenna than the first subset of antennae. In some examples, the second subset of antennae includes at least some of the first subset of antennae. In some examples, the transmitting the RF signal includes transmitting the RF signal at a frequency band corresponding to at least one of 1 MHz, 5 MHz, 10 MHz, 20 MHz, 700 MHz, 2.4 GHz, or 24 GHz. In some examples, a time period including the receiving, processing, and transmitting, includes an active time period of a discontinuous reception (DRX) or discontinuous transmission (DTX) cycle. In some examples, the DRX or DTX cycle includes an inactive time period designated for powering down one or more components of a device operation according to the DRX or DTX cycle.

The steps 402, 404, 406, 408, and 410 of the method 400 are for illustration purposes. In some examples, the steps 402, 404, 406, 408, and 410 may be performed in a different order. In some other examples, various steps 402, 404, 406, 408, and 410 may be eliminated. In still other examples, various steps 402, 404, 406, 408, and 410 may be divided into additional steps, supplemented with other steps, or combined together into fewer steps. Other variations of these specific steps are contemplated, including changes in the order of the steps, changes in the content of the steps being split or combined into other steps, etc.

Figure 5:
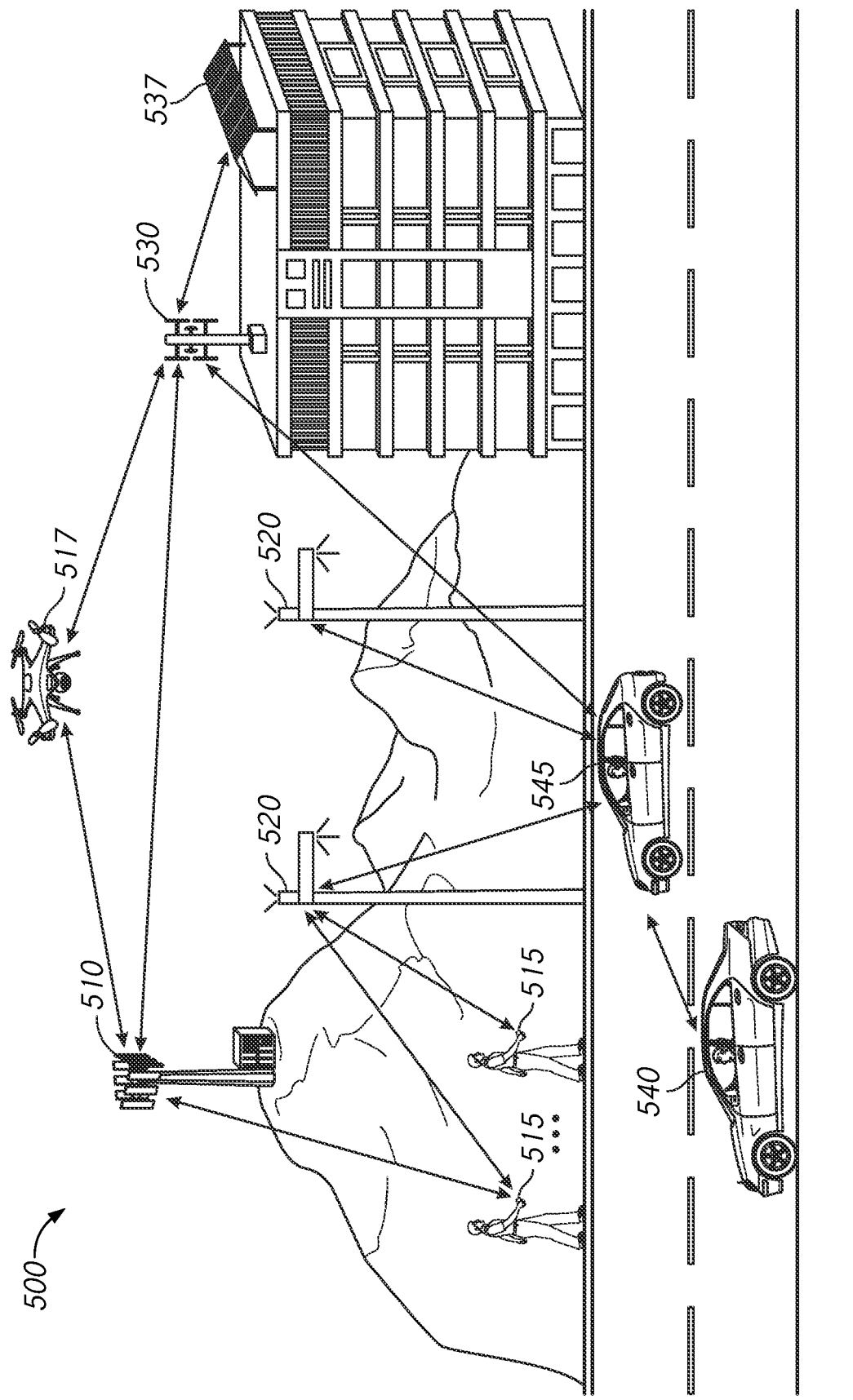
FIG. 5 is a block diagram of a wireless communications system arranged in accordance with aspects of the present disclosure.

FIG. 5 illustrates an example of a wireless communications system 500 in accordance with aspects of the present disclosure. The wireless communications system 500 includes a base station 510, a mobile device 515, a drone 517, a small cell 530, and vehicles 540, 545. The base station 510 and small cell 530 may be connected to a network that provides access to the Internet and traditional communication links. The system 500 may facilitate a wide-range of wireless communications connections in a 5G wireless system that may include various frequency bands, including but not limited to: a sub-6 GHz band (e.g., 700 MHz communication frequency), mid-range communication bands (e.g., 2.4 GHz), and mmWave bands (e.g., 24 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 500 may depict aspects of a radio access network (RAN), and system 500 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 510, communication devices 520, and small cells 530 may be coupled with the core network or with one another, or both, via wired or wireless backhaul links (e.g., S1 interface, X2 interface, etc.).

The system 500 may provide communication links connected to devices or "things," such as sensor devices, e.g., solar cells 537, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, or 200 KHz, for example.

Additionally or alternatively, the IoT may include devices or things operating at different frequencies than traditional cellular technology to facilitate use of the wireless spectrum. For example, an IoT framework may allow multiple devices in system 500 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 537, may utilize less energy, resulting in power-efficiency and may utilize less complex signaling frameworks, such that devices may transmit asynchronously on that sub-6 GHz band. The sub-6 GHz band may support a wide variety of use cases, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment. Such data may be used to indicate an environmental characteristic of the sensor.

In such a 5G framework, devices may perform functionalities performed by base stations in other mobile networks (e.g., UMTS or LTE), such as forming a connection or managing mobility operations between nodes (e.g., handoff or reselection). For example, mobile device 515 may receive sensor data from the user utilizing the mobile device 515, such as blood pressure data, and may transmit that sensor data on a narrowband IoT frequency band to base station 510. In such an example, some parameters for the determination by the mobile device 515 may include availability of licensed spectrum, availability of unlicensed spectrum, and/or time-sensitive nature of sensor data. Continuing in the example, mobile device 515 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 515 may form device-to-device (D2D) connections with other mobile devices or other elements of the system 500. For example, the mobile device 515 may form RFID, WiFi, MultiFire, Bluetooth, or Zigbee connections with other devices, including communication device 520 or vehicle 545. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 515 to provide information (e.g., sensor data) collected on different frequency bands than a frequency band determined by mobile device 515 for transmission of that information.

Moreover, some communication devices may facilitate ad-hoc networks, for example, a network being formed with communication devices 520 attached to stationary objects and the vehicles 540, 545, without a traditional connection to a base station 510 and/or a core network necessarily being formed. Other stationary objects may be used to support communication devices 520, such as, but not limited to, trees, plants, posts, buildings, blimps, dirigibles, balloons, street signs, mailboxes, or combinations thereof. In such a system 500, communication devices 520 and small cell 530 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 515 communicating with base station 510 on a cellular communication band.

The communication devices 520 may form wireless networks, operating in either a hierarchal or ad-hoc network fashion, depending, in part, on the connection to another element of the system 500. For example, the communication devices 520 may utilize a 500 MHz communication frequency to form a connection with the mobile device 515 in an unlicensed spectrum, while utilizing a licensed spectrum communication frequency to form another connection with the vehicle 545. Communication devices 520 may communicate with vehicle 545 on a licensed spectrum to provide direct access for time-sensitive data, for example, data for an autonomous driving capability of the vehicle 545 on a 5.9 GHz band of Dedicated Short Range Communications (DSRC).

Vehicles 540 and 545 may form an ad-hoc network at a different frequency band than the connection between the communication device 520 and the vehicle 545. For example, for a high bandwidth connection to provide time-sensitive data between vehicles 540, 545, a 24 GHz mmWave band may be utilized for transmissions of data between vehicles 540, 545. For example, vehicles 540, 545 may share real-time directional and navigation data with each other over the connection while the vehicles 540, 545 pass each other across a narrow intersection line. Each vehicle 540, 545 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 520 and the vehicle 545, for example, for processing of image data received at both vehicle 545 and vehicle 540, as transmitted by the vehicle 540 to vehicle 545 over the 24 GHz mmWave band. While shown as automobiles in FIG. 5, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 500 in other mmWave bands or other frequency bands, such as 28 GHz, 37 GHz, 38 GHz, 39 GHz, which may be licensed or unlicensed bands. In some cases, vehicles 540, 545 may share the frequency band that they are communicating on with other vehicles in a different network. For example, a fleet of vehicles may pass vehicle 540 and, temporarily, share the 24 GHz mmWave band to form connections among that fleet, in addition to the 24 GHz mmWave connection between vehicles 540, 545. As another example, communication device 520 may substantially simultaneously maintain a 700 MHz connection with the mobile device 515 operated by a user (e.g., a pedestrian walking along the street) to provide information regarding a location of the user to the vehicle 545 over the 5.9 GHz band. In providing such information, communication device 520 may leverage antenna diversity schemes as part of a massive MIMO framework to facilitate time-sensitive, separate connections with both the mobile device 515 and the vehicle 545. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 510 and small cell 530 may wirelessly communicate with devices in the system 500 or other communication-capable devices in the system 500 having at least a sensor wireless network, such as solar cells 537 that may operate on an active/sleep cycle, and/or one or more other sensor devices. The base station 510 may provide wireless communications coverage for devices that enter its coverages area, such as the mobile device 515 and the drone 517. The small cell 530 may provide wireless communications coverage for devices that enter its coverage area, such as near the building that the small cell 530 is mounted upon, such as vehicle 545 and drone 517.

Generally, the small cell 530 may be referred to as a small cell and provide coverage for a local geographic region, for example, coverage of 200 meters or less in some examples. This may be contrasted with a macrocell, which may provide coverage over a wide or large area on the order of several square miles or kilometers. In some examples, a small cell 530 may be deployed (e.g., mounted on a building) within some coverage areas of a base station 510 (e.g., a macrocell) where wireless communications traffic may be dense according to a traffic analysis of that coverage area. For example, a small cell 530 may be deployed on the building in FIG. 5 in the coverage area of the base station 510 if the base station 510 generally receives and/or transmits a higher amount of wireless communication transmissions than other coverage areas of that base station 510. A base station 510 may be deployed in a geographic area to provide wireless coverage for portions of that geographic area. As wireless communications traffic becomes denser, additional base stations 510 may be deployed in certain areas, which may alter the coverage area of an existing base station 510, or other support stations may be deployed, such as a small cell 530. Small cell 530 may be a femtocell, which may provide coverage for an area smaller than a small cell (e.g., 100 meters or less in some examples (e.g., one story of a building)).

While base station 510 and small cell 530 may provide communication coverage for a portion of the geographical area surrounding their respective areas, both may change aspects of their coverage to facilitate faster wireless connections for certain devices. For example, the small cell 530 may primarily provide coverage for devices surrounding or in the building upon which the small cell 530 is mounted. However, the small cell 530 may also detect that a device has entered is coverage area and adjust its coverage area to facilitate a faster connection to that device.

For example, a small cell 530 may support a massive MIMO connection with the drone 517, which may also be referred to as an unmanned aerial vehicle (UAV), and, when the mobile device 515 enters it coverage area, the small cell 530 adjusts some antennas to point directionally in a direction of the vehicle 545, rather than the drone 517, to facilitate a massive MIMO connection with the vehicle, in addition to the drone 517. In adjusting some of the antennas, the small cell 530 may not support as fast as a connection to the drone 517, as it had before the adjustment. However, the drone 517 may also request a connection with another device (e.g., base station 510) in its coverage area that may facilitate a similar connection as described with reference to the small cell 530, or a different (e.g., faster, more reliable) connection with the base station 510. Accordingly, the small cell 530 may enhance existing communication links in providing additional connections to devices that may utilize or demand such links. For example, the small cell 530 may include a massive MIMO system that directionally augments a link to vehicle 545, with antennas of the small cell directed to the vehicle 545 for a specific time period, rather than facilitating other connections (e.g., the small cell 530 connections to the base station 510, drone 517, or solar cells 537). In some examples, drone 517 may serve as a movable or aerial base station.

The wireless communications system 500 may include devices such as base station 510, communication device 520, and small cell 530 that may support several connections to devices in the system 500. Such devices may operate in a hierarchal mode or an ad-hoc mode with other devices in the network of system 500. While described in the context of a base station 510, communication device 520, and small cell 530, it can be appreciated that other devices that can support several connections with devices in the network may be included in system 500, including but not limited to macrocells, femtocells, routers, satellites, and RFID detectors.

In various examples, the elements of wireless communication system 500, such as the drone 517 and the solar cells 537, may be implemented utilizing the systems, apparatuses, and methods described herein. For example, elements of the wireless communication system 100 of FIG. 1A or the wireless communication system 101 of FIG. 1B or the computing system 200 or the computing system 300, may be implemented in any of the elements of communication system 500. For example, the solar cells 537 may be implemented as the electronic device 300. In the example, the drone 517 and the solar cells 537 may be implemented as the electronic devices 120, 122, 124 of FIG. 1A and/or the electronic devices 140, 142, 144, 146, 150 of FIG. 1B communicating over narrowband IoT channels. The drone 517, being implemented as the electronic devices 120, 122, 124 and or the electronic devices 140, 142, 144, 146, 150, may include a sensor to detect various aerodynamic properties of the drone 517 traveling through the air space. For example, the drone 517 may include sensors to detect wind direction, airspeed, or any other sensor generally included vehicles with aerodynamic properties. The drone 517 may provide the sensor data to processing units 111 that are configured to operate for an active time period and process the sensor data over a sequence of configurations partly based on a clock signal (e.g., GMT time) that the drone 517 receives from the base station 510. The drone 517 transmits an RF signal via the antenna to the base station 510 with the sensor data that was processed by the processing units implementing various processing stages, as described herein. Accordingly, the drone 517 may utilize less die space on a silicon chip than conventional signal processing systems and techniques that can include additional hardware or specially-designed hardware, thereby allowing the drone 517 to be of smaller size compared to drones having such conventional signal processing systems and techniques.

Additionally or alternatively, while described in the examples above in the context of the drone 517 and the solar cells 537, the elements of communication system 500 may be implemented as part of any of the computing systems disclosed herein, including: the wireless communication system 100 of FIG. 1A, the wireless communication system 101 of FIG. 1B, the computing system 200 in FIG. 2, the computing system 300 of FIG. 3, or any system or combination of the systems depicted in FIGS. 1-3 described herein.

Figure 6:
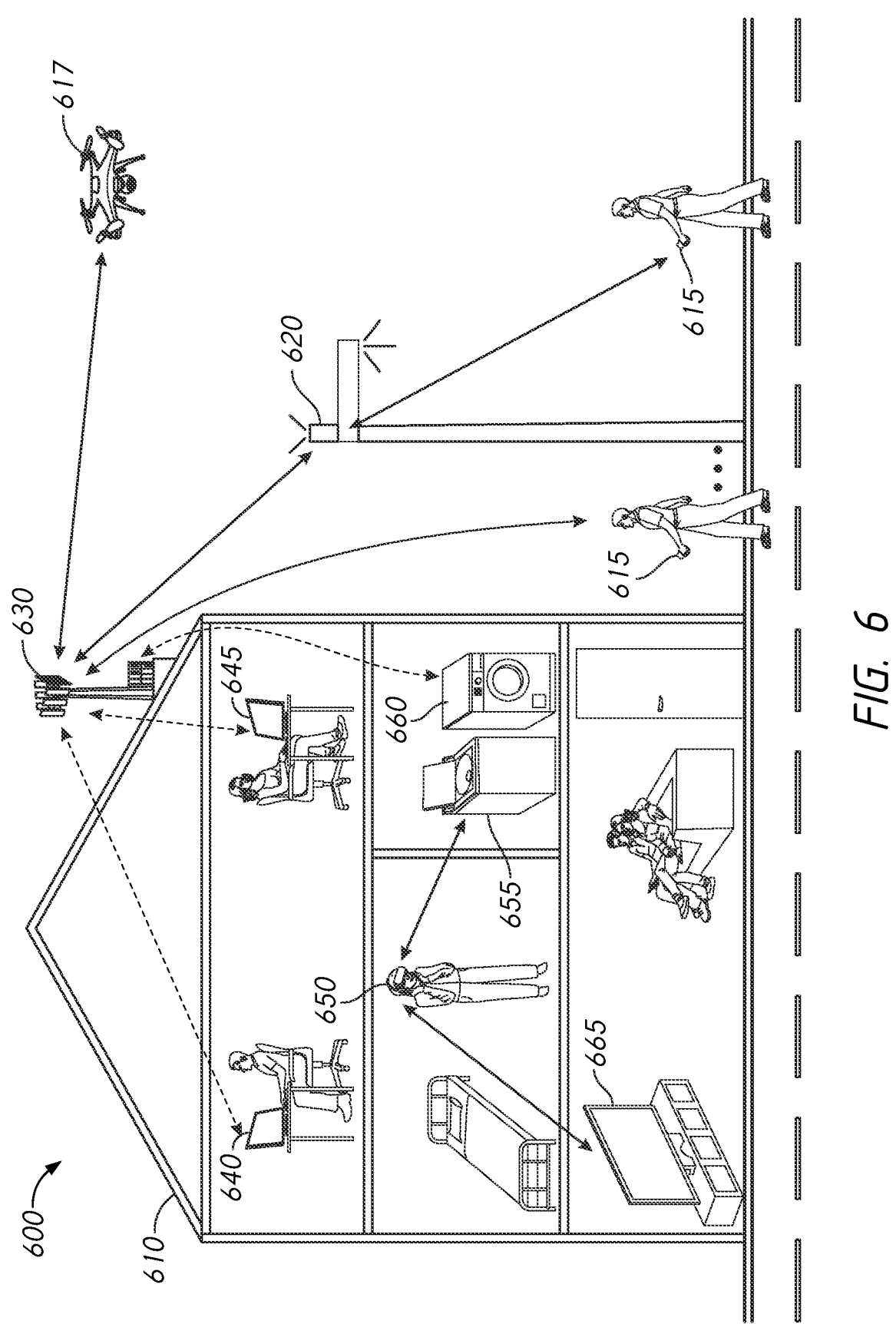
FIG. 6 is a block diagram of another wireless communications system arranged in accordance with aspects of the present disclosure.

FIG. 6 illustrates an example of a wireless communications system 600 in accordance with aspects of the present disclosure. The wireless communications system 600 includes a mobile device 615, a drone 617, a communication device 620, and a small cell 630. A building 610 also includes devices of the wireless communications system 600 that may be configured to communicate with other elements in the building 610 or the small cell 630. The building 610 includes networked workstations 640, 645, virtual reality device 650, IoT devices 655, 660, and networked entertainment device 665. In the depicted wireless communications system 600, IoT devices 655, 660 may be a washer and dryer, respectively, for residential use, being controlled by the virtual reality device 650. Accordingly, while the user of the virtual reality device 650 may be in a different room of the building 610, the user may control an operation of the IoT device 655, such as configuring a washing machine setting. Virtual reality device 650 may also control the networked entertainment device 665. For example, virtual reality device 650 may broadcast a virtual game being played by a user of the virtual reality device 650 onto a display of the networked entertainment device 665.

The small cell 630 or any of the devices of building 610 may be connected to a network that provides access to the Internet and traditional communication links. Like the system 500, the wireless communications system 600 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 500. Wireless communications system 600 may operate and be configured to communicate analogously to system 500. Accordingly, similarly numbered elements of wireless communications system 600 and system 500 may be configured in an analogous way, such as communication device 520 to communication device 620, small cell 530 to small cell 630, etc.

Like the system 500, where elements of system 600 are configured to form independent hierarchal or ad-hoc networks, communication device 620 may form a hierarchal network with small cell 630 and mobile device 615, while an additional ad-hoc network may be formed among the small cell 630 network that includes drone 617 and some of the devices of the building 610, such as networked workstations 640, 645 and IoT devices 655, 660.

Devices in wireless communications system 600 may also form (D2D) connections with other mobile devices or other elements of the wireless communications system 600. For example, the virtual reality device 650 may form a narrowband IoT connections with other devices, including IoT device 655 and networked entertainment device 665. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 650.

In various examples, the elements of wireless communications system 600, such as the mobile device 615, the drone 617, the communication device 620, the small cell 630, the networked workstations 640, 645, the virtual reality device 650, the IoT devices 655, 660, and the networked entertainment device 665, may be implemented as part of any of the wireless communication system 100 of FIG. 1A, the wireless communication system 101 of FIG. 1B, the computing system 200 in FIG. 2, the computing system 300 of FIG. 3, or any system or combination of the systems depicted in FIGS. 1-3 described herein. Additionally, the elements of wireless communications system 600, such as the mobile device 615, the drone 617, the communication device 620, the small cell 630, the networked workstations 640, 645, the virtual reality device 650, the IoT devices 655, 660, and the networked entertainment device 665, may be configured to perform the method 400 of FIG. 4.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A non-transitory computer readable medium comprising executable instructions that, when executed by a processor, cause a wireless communication device to:

receive data to be transmitted to an electronic device;

receive a collaborative processing mode signal indicating whether at least part of the data is to be transmitted by a second wireless communication device;

in response to the collaborative processing mode signal indicating that the at least part of the data is to be transmitted by the second wireless communication device, select a first configuration of a set of configurations for one or more processing units to process the data for transmission;

process, using a neural network, the data to generate a radio frequency (RF) signal using the first configuration; and cause transmission of the RF signal.

2. The non-transitory computer readable medium of claim 1, wherein the executable instructions executed by the processor further cause the wireless communication device to:

in response to the collaborative processing mode signal indicating that the data is to be transmitted solely by the wireless communication device, select a second configuration of the set of configurations for the one or more processing units to process the data for transmission; and process, using the neural network, the data to generate the RF signal using the second configuration.

3. The non-transitory computer readable medium of claim 2, wherein the first configuration includes a first set of weights provided to the neural network and the second configuration includes a second set of weights provided to the neural network.

4. The non-transitory computer readable medium of claim 2, wherein the executable instructions executed by the processor further cause the wireless communication device to:

cause transmission of the RF signal via a first subset of antennae while in the first configuration; and cause transmission of the RF signal via a second subset of antennae while in the second configuration.

5. The non-transitory computer readable medium of claim 4, wherein the second subset of antennae includes more antenna than the first subset of antennae.

6. The non-transitory computer readable medium of claim 4, wherein the second subset of antennae includes at least some of the first subset of antennae.

7. The non-transitory computer readable medium of claim 1, wherein the executable instructions executed by the processor further cause the wireless communication device to cause transmission of the RF signal contemporaneous with a second RF signal transmitted from the second wireless communication device while in the first configuration, wherein the second RF signal is based on the data.

8. A system comprising:

a first wireless communication device comprising a first baseband processor neural network configured to process at least part of data for transmission to a second wireless communication device based on a collaborative processing configuration while collaborative processing is enabled to generate a first radio frequency (RF) signal, wherein the first wireless communication device is configured to transmit the first RF signal; and a third wireless communication device comprising a second baseband processor neural network configured to, while the collaborative processing is enabled, process at least part of the data for transmission to the second wireless communication device based on a collaborative processing configuration to generate a second RF signal, wherein the third wireless communication device is configured to transmit the second RF signal in collaboration with transmission of the first RF signal by the first baseband processor neural network.

9. The system of claim 8, wherein the collaborative processing configuration comprises a first set of weight values provided to the first baseband processor neural network and a second set of weight values provided to a third baseband processor neural network.

10. The system of claim 8, wherein the first baseband processor neural network is configured to process the data for transmission to the second wireless communication device based on a non-collaborative processing configuration while the collaborative processing is disabled to generate the first RF signal.

11. The system of claim 10, wherein the first wireless communication device is configured to transmit the first RF signal using a plurality of antennae while the collaborative processing is disabled and to transmit the first RF signal using a subset of the plurality of antennae while the collaborative processing is enabled.

12. The system of claim 8, further comprising a first base station including the first wireless communication device and a second base station including the third wireless communication device.

13. The system of claim 8, further comprising a first user equipment including the first wireless communication device and a second user equipment including the third wireless communication device.

14. A method, comprising:

receiving, at a wireless communication device, data to be transmitted to an electronic device;

receiving a collaborative processing mode signal indicating whether at least part of the data is to be transmitted by a second wireless communication device;

in response to the collaborative processing mode signal indicating that the at least part of the data is to be transmitted by the second wireless communication device, selecting a first configuration of a set of configurations for one or more processing units to process the data for transmission;

processing, using a neural network of a baseband processor of the wireless communication device, the data to generate a radio frequency (RF) signal using the first configuration; and causing transmission of the RF signal.

15. The method of claim 14, further comprising, in response to the collaborative processing mode signal indicating that the data is to be transmitted solely by the wireless communication device:

selecting a second configuration of the set of configurations for the one or more processing units to process the data for transmission; and processing, using the neural network of the baseband processor of the wireless communication device, the data to generate the RF signal using the second configuration.

16. The method of claim 15, further comprising:

selecting a first set of weights to provide the neural network as the first configuration; and selecting a second set of weights to provide the neural network as the second configuration.

17. The method of claim 15, further comprising:

causing transmission of the RF signal via a first subset of antennae while in the first configuration; and causing transmission of the RF signal via a second subset of antennae while in the second configuration.

18. The method of claim 17, wherein the second subset of antennae includes more antenna than the first subset of antennae.

19. The method of claim 17, wherein the second subset of antennae includes at least some of the first subset of antennae.

20. The method of claim 14, further comprising causing transmission of the RF signal contemporaneous with a second RF signal transmitted from the second wireless communication device while in the first configuration, wherein the second RF signal is based on the data.

* * * * *